United States Patent [19]

Rege

[11] 4,306,779
[45] Dec. 22, 1981

[54] SIDE PIECE FOR SPECTACLE FRAME

[76] Inventor: Alain Rege, 7 Rue Pasteur, 01100 Oyonnax, France

[21] Appl. No.: 145,743

[22] Filed: May 1, 1980

[51] Int. Cl.³ .............................................. G02C 5/18
[52] U.S. Cl. ........................................ 351/118; 2/239
[58] Field of Search ............... 351/118, 119, 19; 2/14, 2/239; 267/58, 60

[56] References Cited

U.S. PATENT DOCUMENTS

| 3,118,962 | 1/1964 | Hammond | 351/118 |
| 3,545,848 | 12/1970 | Sebastian | 351/118 |
| 3,612,668 | 10/1971 | Watkins | 351/118 |
| 3,705,761 | 12/1972 | Fujisawa | 351/118 |
| 3,873,192 | 3/1975 | Anderson | 351/118 |
| 4,153,348 | 5/1979 | Walters et al. | 351/118 |

FOREIGN PATENT DOCUMENTS 1127601 8/1955 France .

Primary Examiner—John K. Corbin
Assistant Examiner—B. W. de los Reyes
Attorney, Agent, or Firm—Fleit & Jacobson

[57] ABSTRACT

The present invention relates to a side piece for spectacle frame, adapted to take a normal position with slight horizontal clearance and a firm holding position in which the curved rear tip is applied against the ear, wherein said side piece is formed by a sheath in which slides a piece which is urged by a spring in the direction of the lens-bearing face and which is normally immobilised by a blade abutting against a fixed socket. A push button enables the piece to be released when desired. The invention is more particularly applicable to the spectacle or sunglasses industry.

6 Claims, 4 Drawing Figures

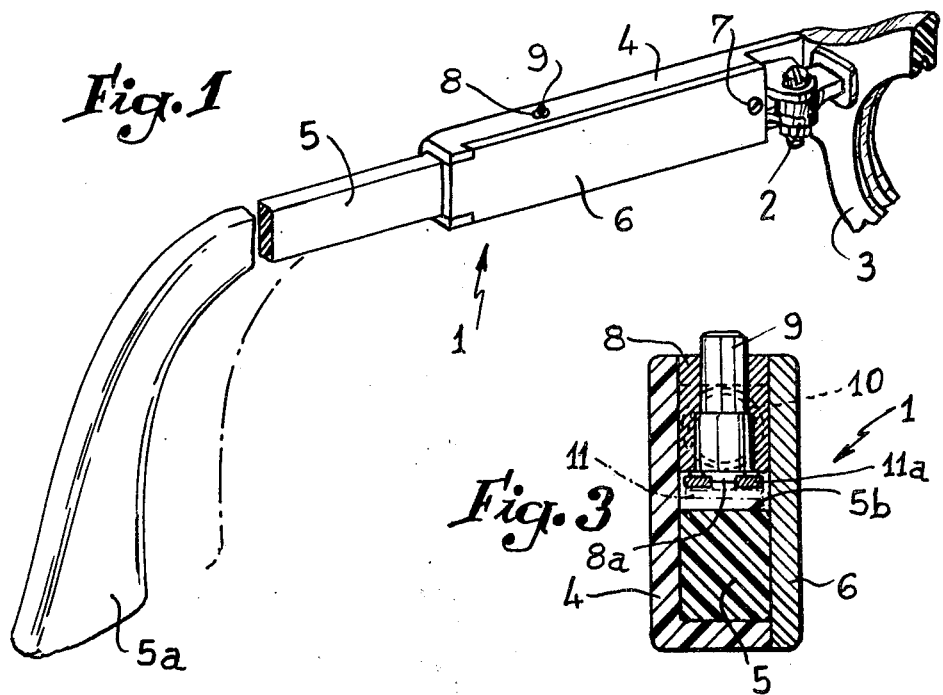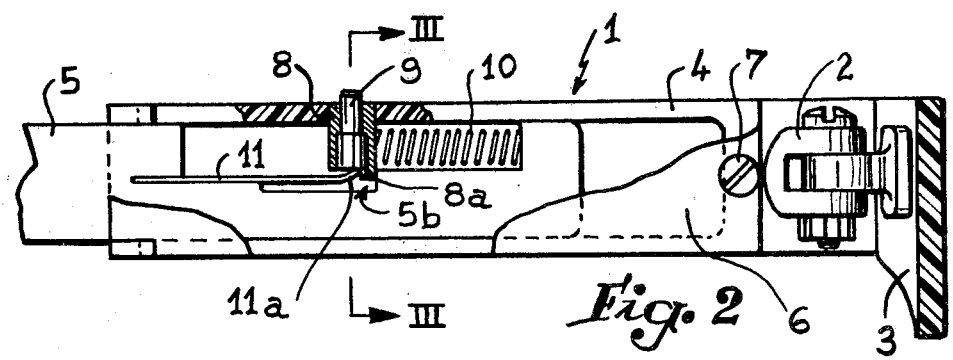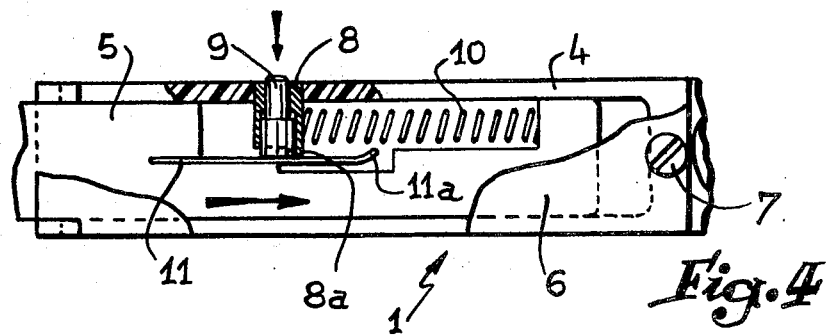

SIDE PIECE FOR SPECTACLE FRAME

The present invention relates to frames for spectacles or sunglasses and more particularly to the arrangement of each of the side pieces hinged to the ends of the lens-bearing face.

It is known that, opposite the hinge, the side pieces comprise a rear part or tip which is curved downwardly to abut against the external ear and thus hold the frame in place on the wearer's nose. To avoid an uncomfortable or even painful pressure on the nose or behind the ears, it is, in practice, indispensable to leave the frame a slight horizontal clearance; however, this clearance becomes particularly awkward when the spectacle wearer indulges in violent exercise or a sport. An average adjustment must therefore be adopted which is obviously not entirely satisfactory for either one of the conditions of wear of the frame.

Furthermore, side pieces have been proposed, formed by two parts which are telescopically engaged in each other. In certain constructions, these two parts are connected by elastic means which tend to hold the tip permanently against the external ear; a frame suitable for violent exercises is thus obtained, but the pressure exerted on the ears makes it practically impossible to wear the spectacles normally. In other embodiments, a braking or locking mechanism is provided which enables the rear part of each side piece to be immobilised in a given axial position; the side pieces are thus rendered adjustable in length, but this adjustment is tiresome as it must, in principle, be made before and after each voilent exercise or sports session.

It is a particular object of the present invention to remedy the above-mentioned drawbacks by providing a side piece for spectacles which allows two distinct conditions for use (normal wear and wear in the case of violet exercise) which are perfectly adapted to said use, passage from one to the other of the two corresponding positions being virtually automatic, without any trial and error or adjustment.

The invention will be more readily understood on reading the following description with reference to the accompanying drawings, in which:

FIG. 1 is a view in perspective showing a side piece of a pair of spectacles according to the invention.

FIG. 2 shows this side piece from the side.

FIG. 3 is a transverse section along III—III (FIG. 2).

FIG. 4 reproduces FIG. 2 in another position of the parts.

Referring now to the drawings, FIG. 1 shows one of the two side pieces 1 of a pair of spectacles, hinged via hinges such as 2 to the ends of the lens-bearing face 3 of the frame. As indicated hereinabove, this side piece 1 is constituted by the telescopic assembly of two distinct pieces, namely on the one hand, a piece 4 in the form of a sheath which bears the hinge 2 and, on the other hand, a piece 5 presenting a rectilinear portion engaged in the sheath 4 for axial slide therein, and a curved portion 5a identical to the conventional tip of conventional side pieces.

The sheath 4 is constituted by a C-shaped transverse section open laterally in the direction of face 3, this opening normally being closed by a cover 6 fixed in place with the aid of one or more screws such as 7. The upper wall of the sheath 4 is fast with a vertical socket 8 (FIGS. 2 and 3) forming guide for a small push button 9 and fixed stop for a spring 10 housed in a notch 5b made in the upper edge of the rectilinear portion of the piece 5; this spring 10 furthermore abuts against the front transverse edge of said notch so that it tends to push the piece 5 permanently in the direction of face 3. This piece 5 is furthermore fast with an elastically deformable blade 11 which extends longitudinally inside the notch 5b and whose free front end 11a (FIG. 3) in the form of a claw abuts against a stud 8a provided at the lower end of the socket 8.

It will be understood that the unit 8-9-11 constitutes a mechanism adapted to immobilise the piece 5 axially against the return means formed by the spring 10. The immobilisation thus effected is perfectly stable so that the optician, on remitting the frame to the acquirer, may adjust in conventional manner the curvature of the rear tip 5a so that said frame has the slight clearance with respect to the wearer's face intended for assuring comfort when wearing the spectacles normally.

On the contrary, when the wearer wishes the frame to be rigidly held on his/her face, for example before indulging in an exercise or sport such as tennis or the like, it suffices to press the push buttons 9 of the side pieces 1 downwards. As illustrated in FIG. 4, the blade 11 is itself pushed downwardly, so that its end 11a escapes from the stud 8a and the released piece 5 is urged by the spring 10 in the direction of face 3 until the corresponding tip 5a abuts against the rear part of the external ear. The frame is thus held firmly on the face.

To return the frame to the position to normal use, the pieces 5 are extracted axially from the sheath 4 until the end 11a of each of the side pieces clips elastically against the stud 8a of the corresponding socket 8 again.

The sheath 4 may be made not only of synthetic material as is assumed, but of metal so as to present only a very small thickness; the outer appearance of the side pieces of the frame is then very similar to that of a conventional frame.

The preceding description has, of course, been given solely by way of example and the replacement of the details of execution described by any other equivalents will not depart from the scope of the invention.

What is claimed is:

1. In a side piece for spectacle frame, of the type constituted by two telescopic pieces, of which a first piece, in the form of a sheath, bears the hinge ensuring the hinged fixation on the lens-bearing face, while the second piece presents a curved rear portion or tip and a rectilinear portion engaged in said sheath for axial slide therein, where said sheath contains on one hand elastic means which permanently tends to bring the second piece towards the lens-bearing face, and on the other hand a mechanism ensuring the immobilization of the second piece in the axial position corresponding to normal wear of the frame, said mechanism being capable of being manipulated to release the immobilization of the second piece and thus cause the elastic application of the tip against the rear part of the external ear of the wearer, while a simple axial traction returns the second piece to the position of immobilization, the mechanism for immobilization comprising a socket fixed in the sheath and extending within the first piece, whose inner end comprises a stud adapted to form a stop for the free end of an elastically deformable blade carried by the second piece, said socket comprising a pushbutton which can be pushed to displace the blade when desired such that the blade is no longer stopped by the stud, in order to release said second piece.

2. The side piece of claim 1, wherein said elastic means is constituted by a spring, one end of which abuts against the socket while the opposite end is applied against a transverse portion of said second piece.

3. A side piece for a spectacle frame, which side piece comprises a second piece which telescopes within a first piece, said first piece being in the form of a sheath;

where said first piece has fixed to it a means for hingedly fastening said first piece to a lens-bearing face, and where the second piece has a curved rear portion and has a linear portion axially slidably engaged within said sheath;

wherein an elastic means is located within said sheath such that it urges and biases the second piece towards the end of the first piece which is hingedly connectable to said lens-bearing face, with said sheath containing a mechanism for immobilizing said second piece in a desired axial position, said mechanism for immobilizing also being capable of being manipulated to release the immobilization of the second piece such that the second piece moves in the direction of the urging of the elastic means, where said second piece is capable of being returned to a position of immobilization by an axial force in a direction opposite to that of the urging of the elastic means, said mechanism for immobilizing comprising a socket fixed in the sheath and extending within the first piece, whose inner end comprises a stud adapted to form a stop for the free end of an elastically deformable blade carried by the second piece, said socket comprising a pushbutton which can be pushed to displace the blade when desired such that the blade is no longer stopped by the stud, in order to release said second piece.

4. The side piece of claim 3, wherein the push button is arranged, such that it is pushed in a direction perpendicular to the length of the first and second pieces, in order to displace the blade when desired.

5. The side piece of claim 4, wherein the deformable blade is constructed, such that when the second piece is returned to the position of immobilization, the deformable blade will slide over the stud, and will be urged in a direction toward the push button, until the deformable blade is secured by the stud, such that movement of the second piece is stopped.

6. The side piece of claim 3, wherein said elastic means is constituted by a spring, one end of which abuts against the socket while the opposite end is applied against a transverse portion of said second piece.

* * * * *

UNITED STATES PATENT AND TRADEMARK OFFICE
CERTIFICATE OF CORRECTION

PATENT NO. : 4,306,779
DATED : December 22, 1981
INVENTOR(S) : Alain REGE

It is certified that error appears in the above—identified patent and that said Letters Patent is hereby corrected as shown below:

On the title page, insert:

[30]         Foreign Application Priority Data

May 2, 1979    France ..................... 79.11678

*Signed and Sealed this*

*Thirteenth* Day of *July 1982*

[SEAL]

*Attest:*

GERALD J. MOSSINGHOFF

*Attesting Officer*        *Commissioner of Patents and Trademarks*